(12) United States Patent
Zid et al.

(10) Patent No.: US 8,570,069 B2
(45) Date of Patent: Oct. 29, 2013

(54) CLOCK GATING CELL CIRCUIT

(75) Inventors: Mounir Zid, Ariana (TN); Alberto Scandurra, Messina (IT)

(73) Assignees: STMicroelectronics S.A., Montrouge (FR); STMicroelectronics S.r.l., Agrate Brianza (Milano) (IT)

( * ) Notice: Subject to any disclaimer, the term of this patent is extended or adjusted under 35 U.S.C. 154(b) by 0 days.

(21) Appl. No.: 13/450,618

(22) Filed: Apr. 19, 2012

(65) Prior Publication Data

US 2012/0268168 A1 Oct. 25, 2012

(30) Foreign Application Priority Data

Apr. 21, 2011 (EP) .................................... 11425114

(51) Int. Cl.
*H03K 19/096* (2006.01)
*H04L 27/08* (2006.01)
(52) U.S. Cl.
USPC ................................ 326/93; 326/95; 375/345
(58) Field of Classification Search
USPC ..................................................... 326/41, 93
See application file for complete search history.

(56) References Cited

U.S. PATENT DOCUMENTS

| 5,646,554 | A  | * | 7/1997 | Kim et al. ........................ 326/93 |
| 7,672,406 | B2 | * | 3/2010 | Takeuchi ....................... 375/345 |
| 7,844,843 | B2 | * | 11/2010 | Freitas ........................... 713/320 |
| 8,390,328 | B2 | * | 3/2013 | Myers et al. .................... 326/93 |
| 2006/0132185 | A1 | * | 6/2006 | Ham ................................ 326/93 |
| 2010/0097131 | A1 | * | 4/2010 | Bainbridge et al. .......... 327/551 |

OTHER PUBLICATIONS

Rhyne, Thomas V. Fundamentals of digital systems design, Prentice-Hall, 1973, pp. 70-71.*
EPO Search Report and Written Opinion for EP 11425114.3 mailed Nov. 28, 2011 (5 pages).

* cited by examiner

*Primary Examiner* — Shawki Ismail
*Assistant Examiner* — Nelson Correa
(74) *Attorney, Agent, or Firm* — Gardere Wynne Sewell LLP

(57) ABSTRACT

A clock gate includes a first Muller gate that receives at its inputs a clock signal and an enable signal. The output of the first Muller gate is applied, with a delayed version of the clock signal, to a second Muller gate. A logic circuit operates to logically combine the output of the second Muller gate with a delayed version of the clock signal. The output of the logic circuit provides a gated clock output.

22 Claims, 8 Drawing Sheets

Gate Representation

US 8,570,069 B2

CLOCK GATING CELL CIRCUIT

PRIORITY CLAIM

This application claims priority from European Application for Patent No. 11425114.3 filed Apr. 21, 2011, the disclosure of which is hereby incorporated by reference.

TECHNICAL FIELD

The present invention relates to a circuit and in particular but not exclusively to a circuit for a clock gating cell.

BACKGROUND

Increasingly with integrated circuits, a high density of transistors is being provided leading to relatively large circuits. The interconnects, as a result, become longer and more resistive. With shrinking feature sizes, the relative resistivity of the wires is increased. Furthermore, as integrated circuit design evolves, the voltages used are being reduced leading to an increase in the signal's delay. Increasingly, high speed clocks are used on integrated circuits with multi-clock islands for better system on chip (SoC) performances. A portion of the system power consumption comes from clock signals. Clock gating technique is a low power technique that reduces the switching activity of transistors and hence reduces the consumed power.

These trends lead to problems in signal delays, skewing and signal racing which can result in metastability. In the case of a gated clock, the clock may be glitchy which can adversely affect performance.

SUMMARY

According to an embodiment, there is a circuit comprising: a first Muller gate having a first input configured to receive a clock signal, a second input configured to receive an enable signal and an output; and a logic circuit having a first input configured to receive said clock signal, and a second input configured to receive an input dependent on said output, said logic circuit being configured to provide a gated clock output.

The circuit may comprise a second Muller gate.

The second Muller gate may have a first input configured to receive the output of the first Muller gate and a second input configured to receive the clock signal.

A first delay may be provided, said first delay being configured to delay the clock signal received by the second input of the second Muller gate.

The second Muller gate is configured to provide an output, said output being provided to said second input of the logic circuit The logic circuit may be configured to provide a clock signal as said gated clock output when said enable signal is active and to provide a signal at one level when said enable signal is inactive.

The logic circuit may comprise an AND gate.

The logic circuit may be configured to provide a clock signal as said gated clock output when said enable signal is inactive and to provide a signal at one level when said enable signal is active.

The logic circuit may comprise an OR gate.

The circuit may comprises a second delay for delaying the clock signal provided to said first input of said second Muller gate.

The clock signal may be provided to said first input of said second Muller gate.

The second delay and the first delay may be arranged in series.

According to another embodiment an integrated circuit comprises a circuit as discussed above.

BRIEF DESCRIPTION OF THE DRAWINGS

Reference will be made by way of example only to the following figures in which.

DETAILED DESCRIPTION OF THE DRAWINGS

It has been proposed to provide glitch free clock gating where a clock signal and an enable signal are provided as inputs to an AND gate. The output provides a gated clock. However, glitches may occur due to the early or late arrival time of the enable signal in some scenarios. In particular, glitches may occur as a result of signal race and may happen when the skew is relatively high and/or when the enable signal comes from another clock domain. The skew can be positive or negative.

It has also been proposed to provide latch based clock gating. An enable signal is provided into the D input of a latch with a clock signal being provided as a clock input and the Q output being provided to an input of the logic gate along with the clock signal being provided to a second input of the logic gate. The output of the logic gate provides the gated clock signal. However, such an arrangement is not efficient when the frequency of the enable domain and the clock frequency are asynchronous. Metastability of the latches may occur due to skew, delay or high clock frequency utilization.

Figure 1:
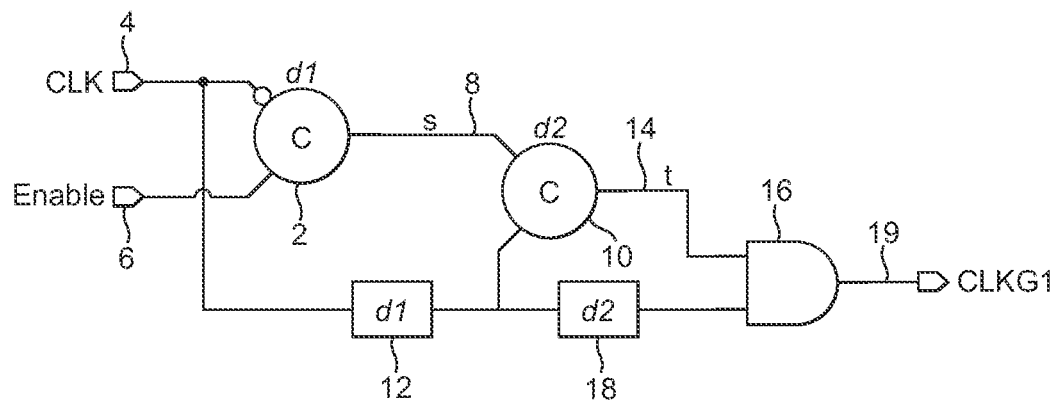
FIG. 1 shows a circuit for providing a gated clock.

Reference is now made to FIG. 1 which shows an asynchronous logic based circuit which is arranged to provide a gated clock output. In other words, the clock which is supplied to a circuit can be disabled or switched off to save power. Embodiments may use a C_element, also known as a Muller gate. In FIG. 1, a first Muller gate 2 is provided with a clock input 4 and an enable input 6. It should be noted that the clock signal is inverted prior to being input to the first Muller gate 2. The clock signal is inverted to prevent a glitch during the first clock cycle of the gated clock in the case where there is a negative clock skew and/or a positive delay of the Enable signal (as will be explained in more detail with reference to FIG. 5c).

The output 8 of the first Muller gate 2 is input to a second Muller gate 10. The second Muller gate 10 also receives an input from the clock source 4. However, the clock signal is input to a first delay element 12 prior to being input to the second Muller gate 10. The role of the delay element 12 is to retard the clock signal by a delay equal to the propagation delay of the Muller gate 2. The output 14 of the second Muller gate is input to a first AND gate 16. The output of the first delay element 12 is also input to a second delay element 18, the output of which provides a second input to the first AND gate 16. The role of the delay element 18 is to retard the output of the first delay element 12 by a delay equal to the propagation delay of the Muller gate 10. Delay elements 12 and 18 are optional and may be used only when the propagation delays of the Muller gates 2 and 10 are noticeable, taking into account the clock period. This is the case when the clock operates at high frequency.

The output of the AND gate 16 provides a first gated clock signal.

The delays may be provided to avoid signal racing. The arrangements can be used to avoid glitches.

Figure 2:
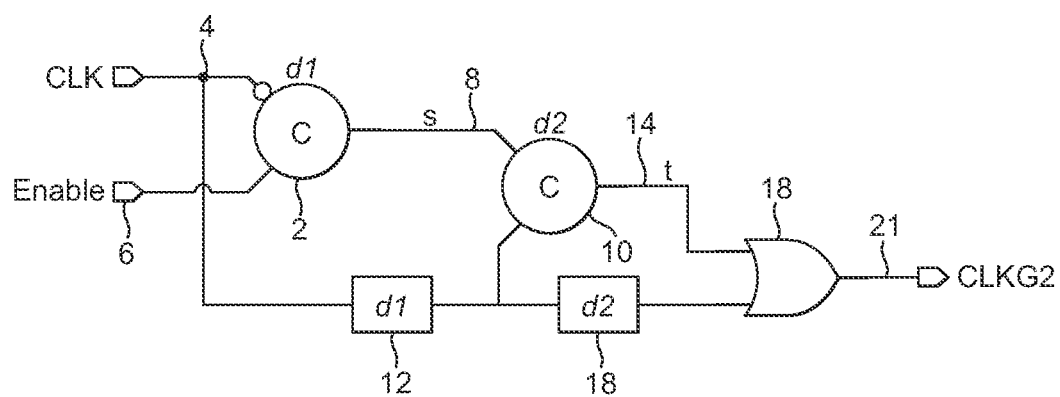
FIG. 2 shows a second circuit for providing a gated clock.

Reference is made to FIG. 2 which shows a similar arrangement to that shown in FIG. 1, with those same elements marked with the same reference number. However, the AND gate 16 has been replaced by an OR gate 18 which provides a second gated clock signal.

Some embodiments have a relatively low transistor count, for example of the order of 30 transistors. The circuits may be efficient even if the frequency of the enable domain and the clock domain are asynchronous.

Figure 3:
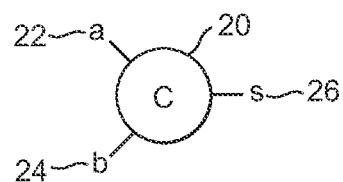
FIG. 3 shows the gate representation of the Muller gate used in the circuits of FIGS. 1 and 2.

Reference is made to FIG. 3 which shows schematically the gate representation of the Muller gate. The Muller gate 20 has an a input 22, a b input 24 and an s output 26. The truth table for the Muller gate is represented below.

| a | b | S |
|---|---|---|
| 0 | 0 | 0 |
| 0 | 1 | s- |
| 1 | 0 | s- |
| 1 | 1 | 1 |

It should be appreciated that the s-notation means that the output is unchanged.

The output can be represented mathematically as follows: s=ab+s (a+b)

The Muller gate is a gate used for the design of asynchronous systems. The Muller gate is used to ensure the synchronization or rendez-zvous between asynchronous signals.

Figure 4:
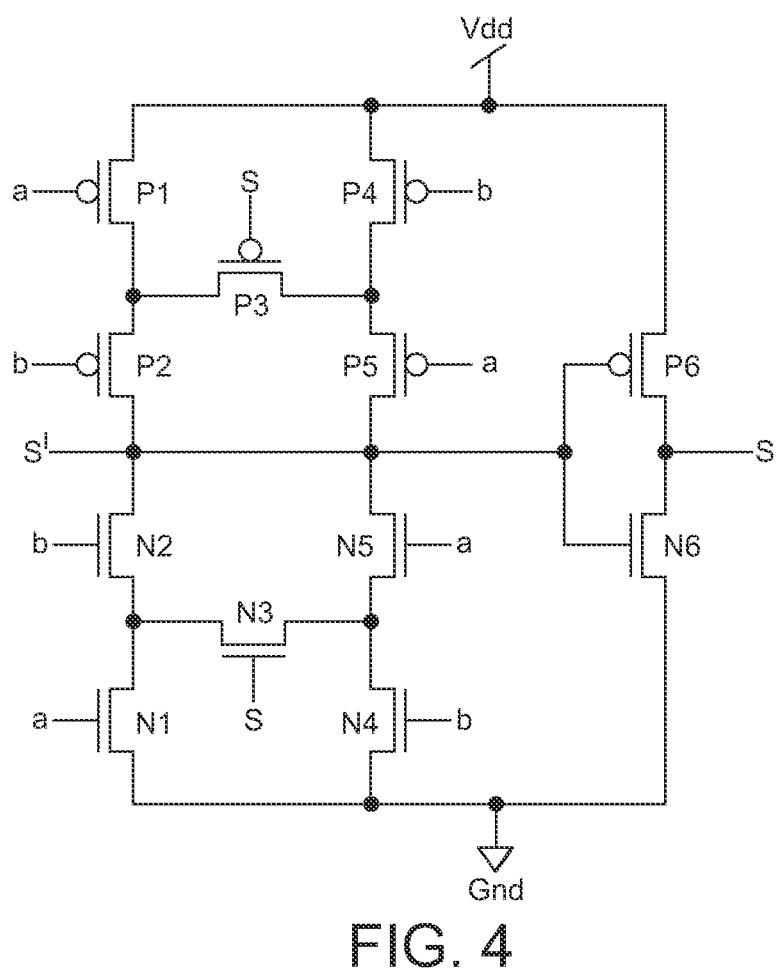
FIG. 4 shows a CMOS implementation of a Muller gate.

Reference is now made to FIG. 4 which schematically shows the Van Berkel transistor-level implementation of the Muller gate which uses MOS transistors. Between a voltage supply VDD and ground are arranged in series from VDD to ground in the following order: a first P type transistor P1; a second P type transistor P2; a second N type transistor N2; and a second N type transistor N1. The gates of the first P type transistor P1 and the first N type transistor N1 are connected or coupled to the A input whilst the gate inputs of the second P and N transistors P2 and N2 are connected or coupled to the B input.

Arranged in parallel to this first series of transistors is a second set of transistors, again connected or coupled between VDD and ground in series in the following order: a fourth P type transistor P4, a fifth P type transistor P5, a fifth N type transistor N5 and a fourth N type transistor N4. The gate element of the fourth P type transistor P4 and the date of the fourth N type transistor N4 are connected or coupled to the B input. The gate inputs of the fifth N and P type transistors N5 and P5 are connected or coupled to the A input.

In parallel with the first and in parallel with the second set of series transistors is a third set of series transistors arranged between VDD and ground. Again, the transistors are connected or coupled in the following order from VDD to ground. A sixth P type transistor P6 and a sixth N type transistor N6. The gates of the sixth N type and P type transistors N6 and P6 are coupled together and are coupled to a node between the fifth and sixth P type and N type transistors N5 and P5 as well as to a node between the second N and P type transistors N2 and P2 and provide the S' output. The S output is provided by a node which is provided between the sixth N and P type transistors N6 and P6.

A third P type transistor is arranged between a node between the first and second P type transistors and a further node between the fourth and fifth P type transistors. The control gate of the third P type transistor is connected or coupled to the S output provided by the node between the fixed N and P type transistors N6 and P6. Likewise, a third N type transistor N3 is provided between a first node located between the first and second N type transistors N1 and N2 and a second node provided between the fourth and fifth N type transistors N4 and N5. Again, the gate element of the third N type transistor is connected or coupled to the S output node.

It should be appreciated that FIG. 4 shows one way of implementing the gate. Alternative implementation may be used to provide the Muller gate.

Figure 5A:
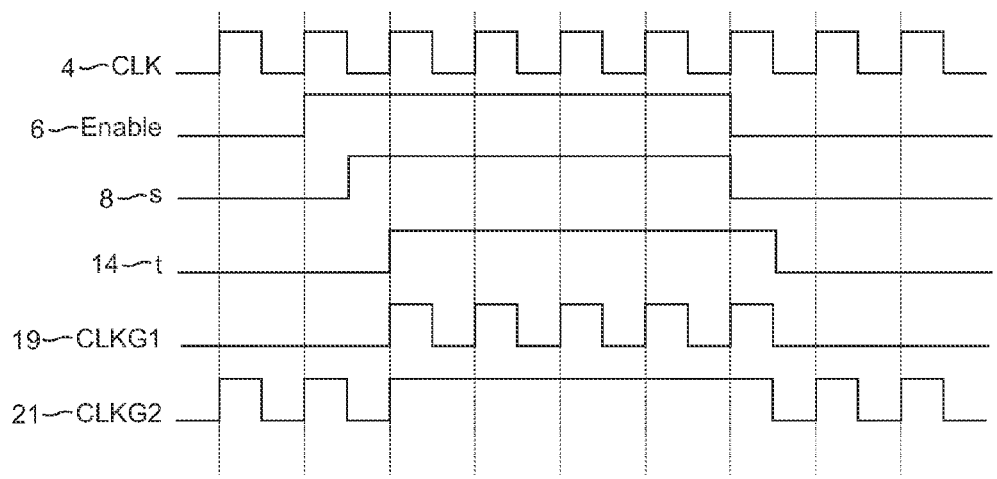
FIG. 5a shows a first timing diagram for the circuits of FIG. 1 and FIG. 2 in the case when there is no clock skew and no enable signal delay.

Reference is made to FIG. 5a which shows a first timing diagram for the circuits of FIG. 1 and FIG. 2. The first line of the timing diagram shows the clock signal 4. The second line shows the enable signal 6. The third line shows the output 8 of the first Muller gate 2 whilst the fourth line shows the output 14 of the second Muller gate 10. The fifth line shows the gated clock output signal 19 of the AND gate 16 whilst the final line shows the gated clock signal 21 output by the OR gate 18.

In the arrangement shown on FIG. 5a, the enable signal 6 changes, low state to a high state (the enable state) at the same time that the clock transitions, low state to a high state. The output of the first Muller gate transitions to the high state at the next clock edge which an example of FIG. 5a is the next falling clock edge. The output of the second Muller gate goes high after the output of the first Muller gate has gone high, at the next clock edge, which is a rising clock edge. With the arrangement of FIG. 1, the clock signal output by the AND gate is low until the output of the second Muller gate 10 goes high. Once the output of the first Muller gate goes high, the clock signal output by the AND gate 16 follows the clock signal 4.

In contrast, in the arrangement shown in FIG. 2, the clock signal output by the OR gate 18 follows the input clock signal until the output of the second Muller gate goes high. At that point, the gated clock signal output by the OR gate simply stays at the high level.

When the enable signal goes low, this causes the output 8 of the first Muller gate to go low. This in turn causes the output of the second Muller gate also to go low, at the next clock edge which in the example shown in FIG. 5a is a falling clock edge. This will cause the gated clock signal 19 output by the first AND gate 16 to be low. In contrast, the clock signal 21 output via the OR gate 18 starts to follow the clock signal 4.

Figure 5B:
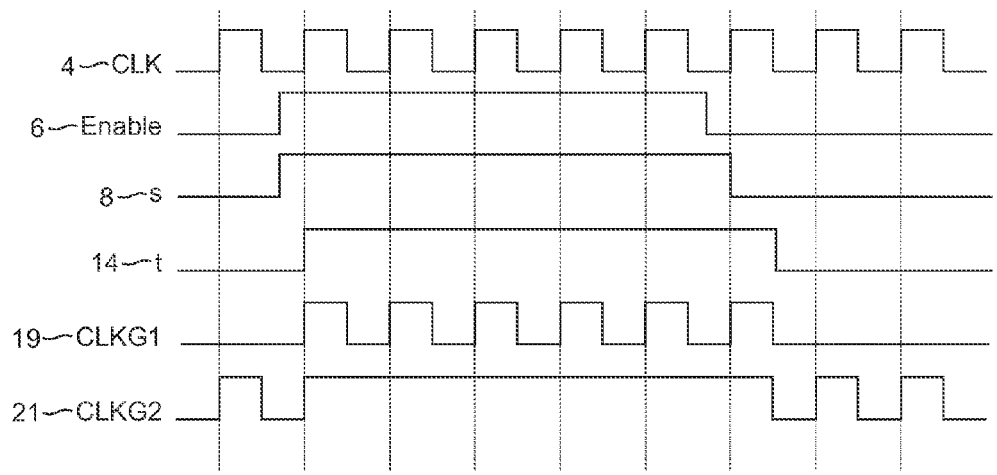
FIG. 5b shows a second timing diagram for the circuits of FIG. 1 and FIG. 2 in the case when there is a positive clock skew and/or negative enable signal delay.

FIG. 5b is similar to that shown in FIG. 5a. However, the enable signal changes midway during a low point in the clock cycle 4. The output of the first Muller gate immediately follows the enable signal and goes high. The output 14 of the second Muller gate goes high at the next change in the clock signal which is a rising edge.

When the enable signal goes low, it is partway through the low part of the clock signal. The output of the first Muller gate goes to the low value at the next change in the clock signal which is a rising edge of the clock signal. The output of the second Muller gate then goes to the low value at the next change in the clock signal which is a falling edge of the clock signal in this case.

Figure 5C:
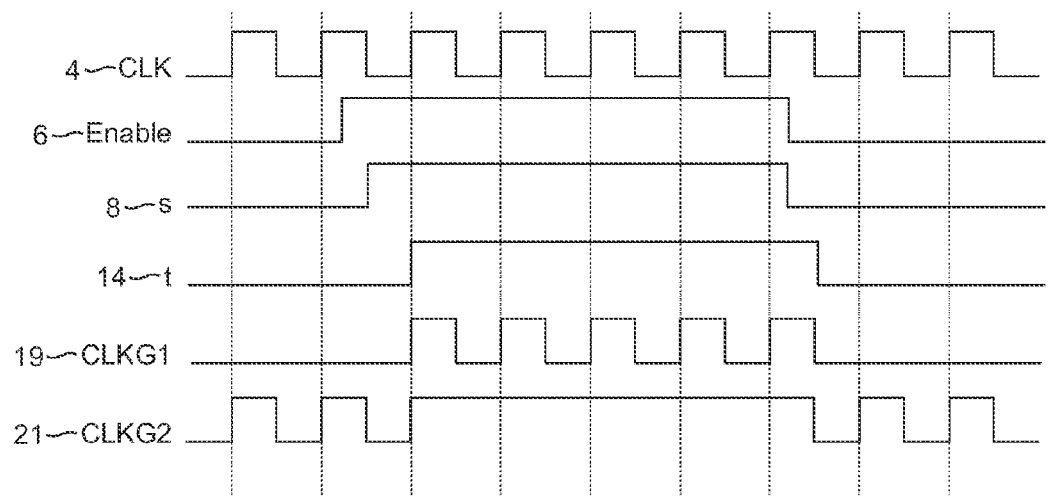
FIG. 5c shows a third timing diagram for the circuits of FIG. 1 and FIG. 2 in the in the case when there is a negative clock skew and/or positive enable signal delay.

The first and second clock signals follow the same pattern of the output signal 14 of the second Muller gate as described in relation to FIG. 5*a*. Reference is now made to FIG. 5*c* which shows the enable signal rising midway through a period when the clock signal is high. The signals are as shown in FIGS. 5*a* and 5*b*. The output of the first Muller gate follows the enable signal and goes high at the next clock edge, which is a falling clock edge in this case. The output 14 of the second Muller gate goes high at the next change in the clock signal which is a rising edge in this case.

When the enable signal goes low, it is partway through the high part of the clock signal. The output of the first Muller gate goes to the low value more or less at the same time. The output of the second Muller gate then goes to the low value state at the next change in the clock signal which is a falling edge of the clock signal in this case. In this case, the output goes to the low state while the output 21 starts to follow the clock signal 4, In the embodiments shown, AND or OR gates are used. It should be appreciated that in alternative embodiments, different logic gates or gates can be used.

Figure 6:
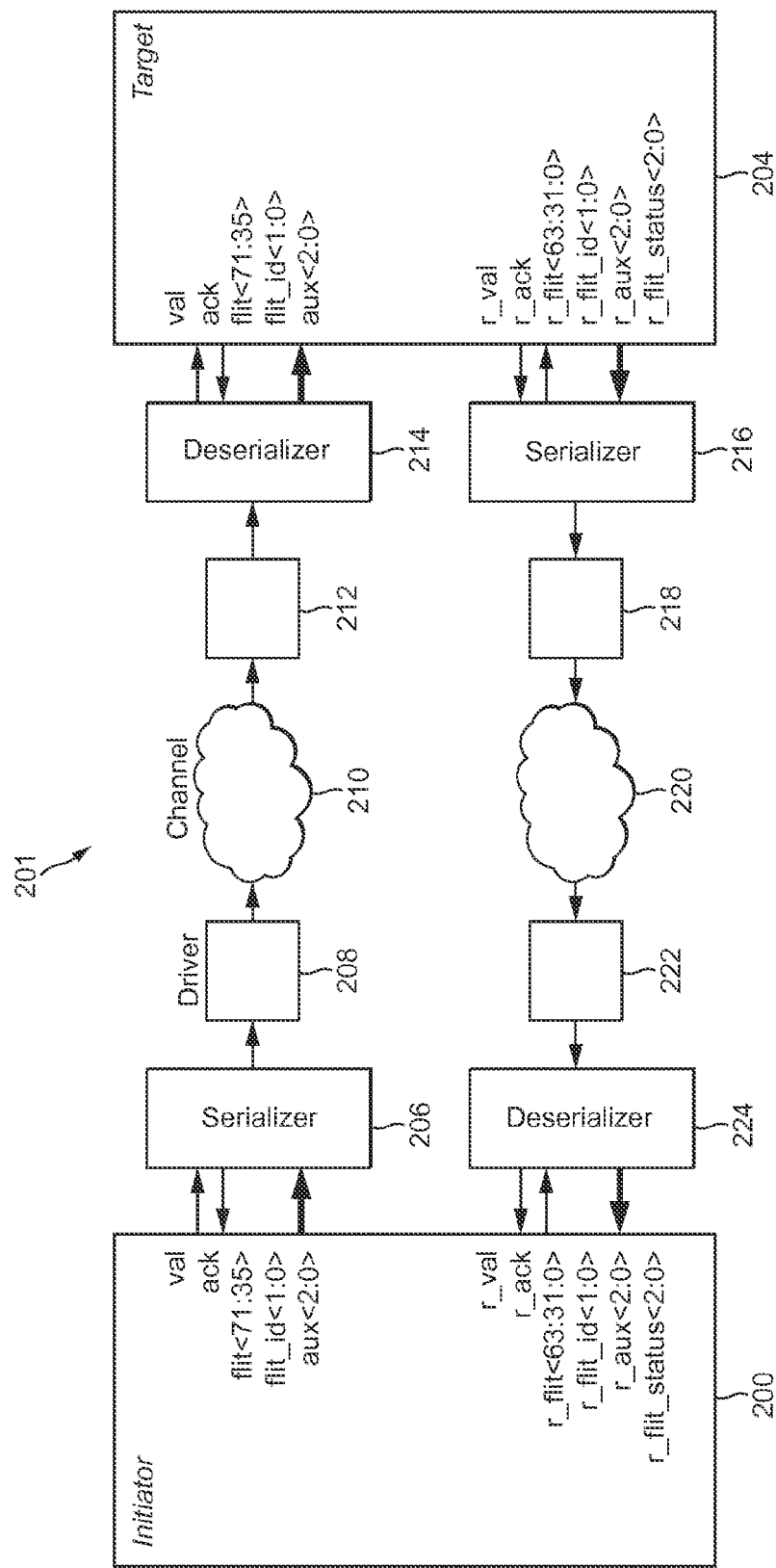
FIG. 6 schematically shows an integrated circuit.

Reference is made to FIG. 6 which schematically shows an integrated circuit 201 in which embodiments may be incorporated. The integrated circuit 201 has an initiator 200 which is arranged to communicate with a target 204. The initiator 200 will typically issue requests which are sent to the target 204 and the target 204 will typically respond to the requests. The responses are typically sent back to the initiator 200.

It should be appreciated that in practice, more than one initiator 200 may be provided and/or more than one target 204 may be provided. It should also be appreciated that a given initiator may be a target. Additionally or alternatively, a given target may also be an initiator.

The requests output by the initiator 200 are output in a parallel format to a first serializer 206 which converts the parallel format request into a serial form. The serialized data is output to a first driver 208 which put the data onto a first channel 210. The output end of the first channel is input to a trans-impedance amplifier 212. The output of the amplifier is input to a first deserializer 214. The deserializer 214 processes the received serial stream back into the parallel format. The requests, in the parallel format, are output to the target 204.

A similar path is provided for the responses to the request. The responses output by the target 204 are output in a parallel format to a second serializer 216 which converts the parallel format response into a serial form. The serialized data is output to a driver 218 which put the data onto a second channel 220. The output end of the second channel is input to a driver 222. The output of the driver 222 is input to a second deserializer 224. The second deserializer 224 processes the received serial stream back into the parallel format. The responses, in the parallel format, are output to the initiator 200.

It should be appreciated that any suitable connection or coupling can be used for the channels 210 and 220. The channels may be provided by a wires, for example metal wires, optical interconnects or any other suitable connection environment or combination of two or more connection environments.

The request and the responses to the requests may comprise data, addressing information, control signals and/or instructions. At least part of the request and response may be in packet form. In other embodiments the data can be in any other suitable format. A signaling protocol may be used in some embodiments. For example, in one embodiment, a node sending data may send a valid signal and a node receiving data may send an associated acknowledgement signal. It should be appreciated that no protocol may be used and/or any other signaling protocol may be used in other embodiments.

In some embodiments the data is sent once the valid signal is high and the acknowledgement represents the confirmation of the receipt of the data by the recipient. This valid/acknowledgement protocol may be used between the initiator and the first serializer 206/second deserializer 224 and between the target and the first deserializer 214/second serializer 216.

Figure 7:
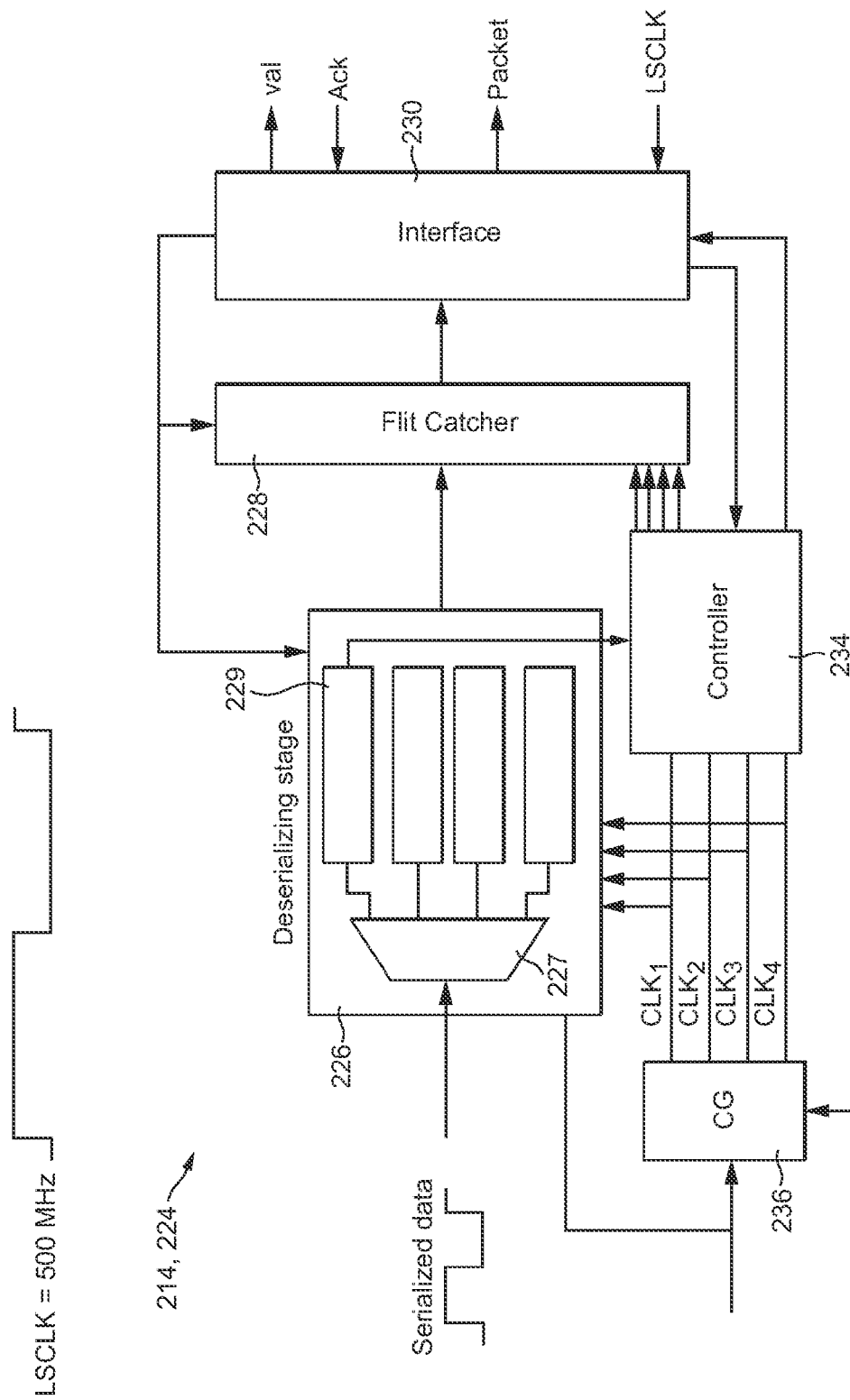
FIG. 7 shows the deserializer of FIG. 6 in more detail.

Reference is made to FIG. 7 which shows the deserializer 214 or 224 in more detail. The serialized data is received by a deserializing stage 226. The deserializing stage has a demultiplexing arrangement 227 which divides the serialized data into the constituent channels which are deserialized by the registers 229. The output of the deserializing stage, in parallel format is loaded by a data catcher 228. The registers 229 are successively output into the data catcher which acts as a data buffer.

The output of the data catcher 228 is transferred to an interface 230 which will output the data in packet form. The interface 230 is also configured to implement the valid/acknowledgement protocol, generating the valid signal and receiving the acknowledgement signal. The interface receives a clock signal LSCLK which can be at any suitable frequency. By way of example only, the LSCLK may be at 500 MHz.

A four phase clock generator 236 is provided. The clock generator receives the output of a phase locked loop and generates four clock signals CLK1, CLK2, CLK3, and CLK4. The four clock signals have the same frequency but different phases. The four outputs of the clock generator 236 are input to the deserializing stage 226 and a controller 234. The controller receives an output from the deserializing stage 229 indicating when the data in the registers is ready for output and an output from the interface 230.

The controller provides the four control signals to the data catcher 228 and provides a control output to the interface. The deserializing stage 226 also receives the output of the phase locked loop.

Figure 8:
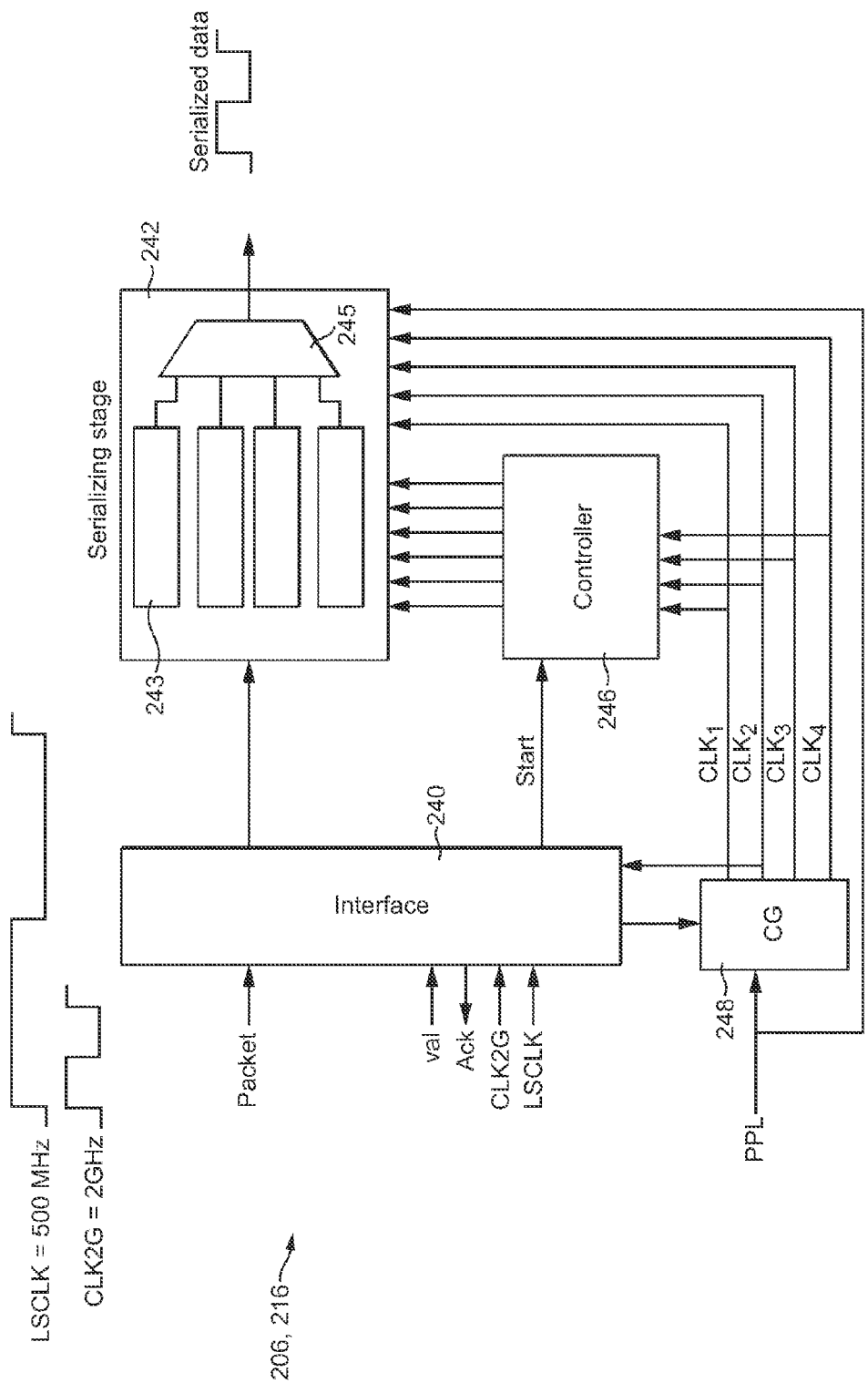
FIG. 8 shows the serializer of FIG. 6 in more detail.

Reference is made to FIG. 8 which shows the serializer 206 or 216 in more detail. The data in parallel format is received by an interface 240. The interface 240 is also configured to implement the valid/acknowledgement protocol, generating the acknowledgment signal in response and receiving the valid signal. The interface receives a clock signal LSCLK which can be at any suitable frequency. By way of example only, the LSCLK may be at 500 MHz. The interface 240 receives a further clock signal CLK2G which can be any suitable value and in example is 2 GHz.

The data in parallel format is output by the interface 240 to a serializing stage 242. The serializing stage 242 has a quad parallel in serial out shift register, each register stores a quarter of the data and serializes the data. The registers outputs then four lower speed serial data. The registers 243 are each connected or coupled to a respective input of a multiplexing arrangement 245 which mixes the constituent channels into a high speed serialized data stream.

A four phase clock generator 248 is provided. The clock generator receives the output of a phase locked loop and generates four clock signals CLK1, CLK2, CLK3, and CLK4. The four clock signals have the same frequency but decayed by 90° phase shift.

In particular, the four clock signals have 90 degrees phase shift. Thus the first clock signal has no phase shift, the second clock signal has 180 degree phase shift, the third clock signal has 90 degree phase shift and the fourth has a 270 degree phase shift. The four outputs of the clock generator 248 are input to the serializing stage 242 and a controller 246. The clock generator receives an enable output from the interface 240. The controller provides the four clock signals to the serializing stage 242 and receives a start signal from the interface 240.

In some embodiments the arrangement of FIGS. 1 and/or 2 may be used to generate one or more of the clock signals used in the deserializer and/or serializer of FIGS. 6 to 8.

In some embodiments, the circuit may be modified to have only one Muller gate. For example the, second Muller gate may be omitted and the output of the first Muller gate is input to a suitable logic gate or gates such as an AND gate or OR gate or the like. In alternative embodiments more than one Muller gate may be provided.

Some embodiments may provide glitch free or glitch reduced clock. Some embodiments may be used to gate a high speed clock and/or when an enable signal domain and the clock domain are asynchronous for example in the case of a multi-clock islands system on chip.

In some embodiments, one or more of the delay elements may be omitted. The delay elements may be replaced by any other suitable delay.

Figure 9:
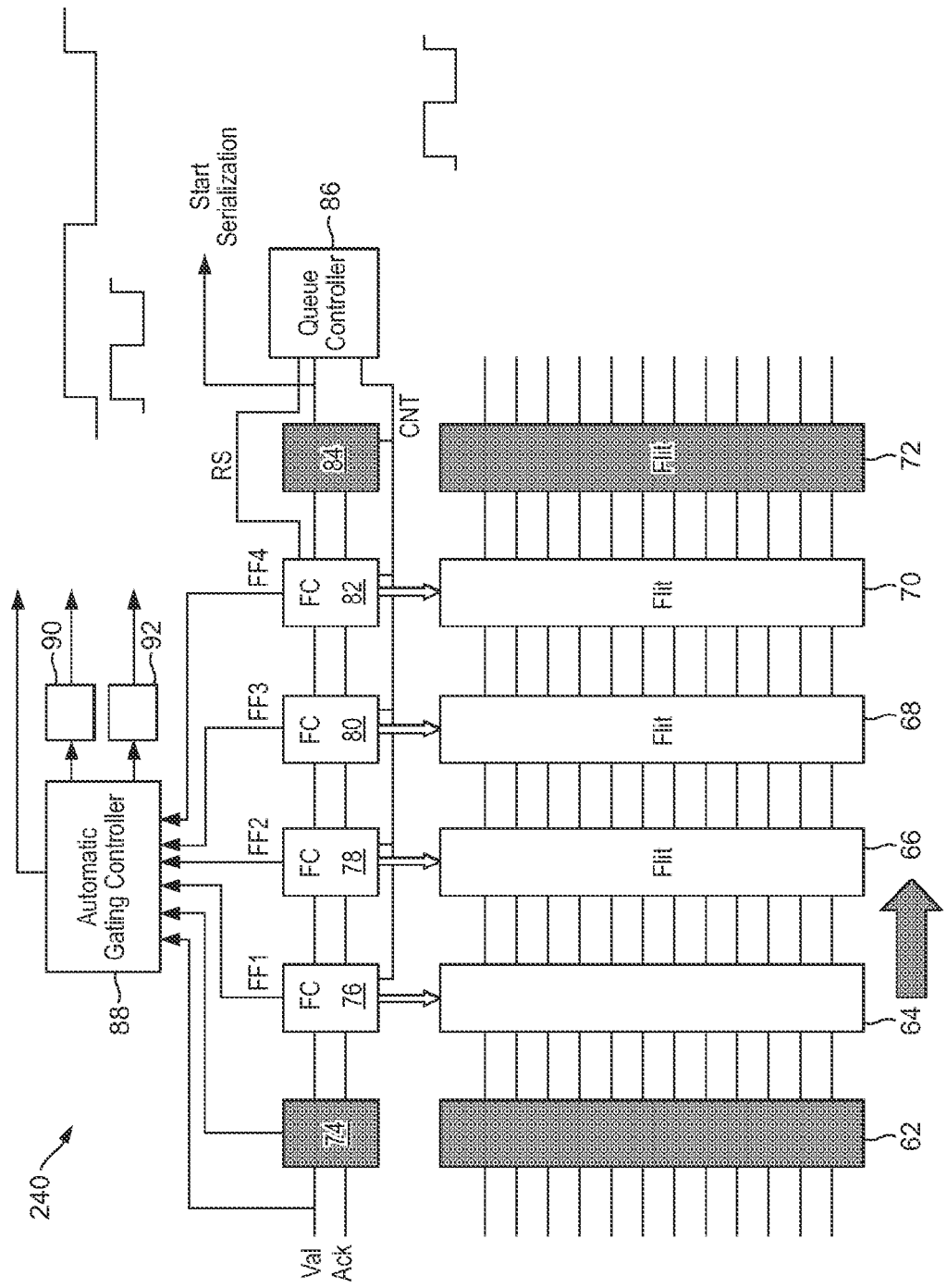
FIG. 9 shows schematically the interface of the serializer of FIG. 3.

Reference is made to FIG. 9 which shows the interface 240 of FIG. 8.

The interface comprises, in the example shown in FIG. 9 six data stores, 62, 64, 66, 68, 70 and 72. The first data store 62 has N inputs which comprise the parallel data which is received either from the initiator or the target. The first data store 62 has N outputs which allow data to be shifted to a second data store 64.

Likewise, the output of the second data store 64 can be shifted to the third data store 66 and so on. The second, third, fourth and fifth data stores each have a respective controller 76, 78, 80 and 82. A first controller 74 is provided which is arranged to receive a valid (request) signal from the source of the packet. In response to that request, the first controller provides an acknowledgement signal ACK which is returned to the source of the packet. The valid signal is input to an automatic gating controller 88. The controller 74 is also arranged to provide an output to the automatic gating controller. The first flow controller is arranged to send the received valid signal to the second controller 76 which is arranged to provide the ACK signal to the first flow controller. Likewise, the second controller 76 is arranged to output the valid signal to the third controller 78 which outputs the valid signal to the fourth flow controller 80 and so on until the valid signal is received by the sixth flow controller 84. The sixth flow controller 84 outputs the ACK signal to the fifth controller 82 which outputs the ACK signal to the fourth flow controller and so on until the ACK signal is output by the second controller 76 to the first controller 74. The second, third, fourth and fifth controllers are arranged to control the respective data stores. In particular, these controllers control whether or not the clock signal which is provided to the respective data store is gated or not. Thus, if there is no need for data to be received from a preceding data store or output to a succeeding data store, that is the data state is held, then no clock signal is applied to the data store, thus saving power.

The data store can take any suitable format but may comprise an N fold flip-flop. When no clock signal is to be applied to the N fold flip-flop, a low logic level signal will be applied to the respective clock inputs of the flip-flops of the N fold flip-flop. The second to fifth controllers 76, 78, 80 and 82 are also configured to provide outputs to the automatic gating controller. A queue controller 86 is provided which has a control output which is input to each of the second to six flow controllers. The bank registers 62 and 62 are permanently clocked by the gated LSCLK clock.

When the valid signal is logic high, the automatic gating controller 88 is configured to output via a first clock gating cell 90 a first clock signal and via a second clock gating cell 92 a second clock signal. These gating cells may be as described in relation to FIGS. 1 to 5. The first clock signal has a first frequency which is relatively high and may for example be 2 GHz. The second clock signal is relatively low and may be for example 500 MHz. Further, the automatic gating controller is configured to generate an enable signal for enabling the clock generator 248. The first controller 74 then outputs the valid signal to the automatic gating controller when the data is loaded in the first data store. The outputs of the respective clock gating cells are used to clock the arrangement of FIG. 9.

The RS signal from the fifth controller 82 to the queue controller is the signal responsible for the reset of the counter. The queue controller 86 provides an output control signal CNT.

Clock gating can be used in any products such as FPGA (field programmable gate array), DSP (digital signal processors), SoCs (system on chip), microprocessors and microcontrollers.

Some embodiments may be better for both high and low frequency glitch free clock gating. Some embodiments can be used where the prior art cannot be used because of: high frequency; clock skew; signal delay; and/or asynchronism between clock islands within a multi-clock system. It should be noted that skew, delays and asynchronism may cause errors and a glitchy gated clock at low frequencies as this is related to flip flop metastability.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit comprising:
   a first Muller gate having a first input configured to receive a clock signal, a second input configured to receive an enable signal and a first output;
   a delay circuit configured to delay the clock signal by a delay based on a propagation delay associated with the first Muller gate to produce a first delayed clock signal;
   a second Muller gate having a first input configured to receive the first output of the first Muller gate and a second input configured to receive the first delayed clock signal from said delay circuit; and
   a logic circuit having a first input configured to receive a second delayed clock signal from said delay circuit, a second input configured to receive an input dependent on an output of the second Muller gate, and an output configured to provide a gated clock output.

2. The circuit of claim 1, wherein the output of the second Muller gate is provided to said second input of the logic circuit.

3. The circuit of claim 1, wherein said logic circuit is configured to provide a clock signal as said gated clock output when said enable signal is active and to provide a signal at one logic level when said enable signal is inactive.

4. The circuit of claim 3, wherein said logic circuit comprises an AND gate.

5. The circuit of claim 1, wherein said logic circuit is configured to provide a clock signal as said gated clock output when said enable signal is inactive and to provide a signal at one logic level when said enable signal is active.

6. The circuit of claim 5, wherein said logic circuit comprises an OR gate.

7. The circuit of claim 1, wherein said delay circuit comprises a second delay configured to delay the first delayed clock signal to the second input of the second Muller gate and a second delay configured to delay the delayed clock signal for application to the first input of said logic circuit.

8. The circuit of claim 1, wherein said clock signal provided to said first input of said second Muller gate has passed through a first delay of said delay circuit.

9. The circuit of claim 7, wherein said second delay and said first delay are coupled in series.

10. The circuit of claim 1, as implemented in an integrated circuit.

11. The circuit of claim 1, wherein the circuit is a component of a clock generator.

12. The circuit of claim 1, further comprising a controller circuit having a clock input coupled to receive the gated clock output.

13. The circuit of claim 1, further comprising a data serializer circuit having a clock input coupled to receive the gated clock output.

14. The circuit of claim 1, further comprising a data deserializer circuit having a clock input coupled to receive the gated clock output.

15. The circuit of claim 1, further comprising at least one member of a group comprising a data serializer circuit or a data deserializer circuit having a clock input coupled to receive the gated clock output.

16. The circuit of claim 7, wherein said delay circuit delays the first clock signal by a delay based on a propagation delay associated with the second Muller gate.

17. A circuit comprising:
a first Muller gate having a first input configured to receive a clock signal, a second input configured to receive an enable signal and a first output;
a first delay circuit configured to delay the clock signal by a delay equal to a propagation delay associated with the first Muller gate to produce a first delayed clock signal;
a second Muller gate having a first input configured to receive the first output of the first Muller and a second input configured to receive the first delayed clock signal from said first delay circuit;
a second delay circuit configured to delay the first delayed clock signal from said first delay circuit to produce a second delayed clock signal; and
a logic circuit having a first input configured to receive the second delayed clock signal from said second delay circuit, a second input configured to receive an output from said second Muller gate, and an output configured to provide a gated clock output.

18. The circuit of claim 17, wherein said logic circuit is configured to provide a clock signal as said gated clock output when said enable signal is active and to provide a signal at one logic level when said enable signal is inactive.

19. The circuit of claim 18, wherein said logic circuit comprises an AND gate.

20. The circuit of claim 17, wherein said logic circuit is configured to provide a clock signal as said gated clock output when said enable signal is inactive and to provide a signal at one logic level when said enable signal is active.

21. The circuit of claim 20, wherein said logic circuit comprises an OR gate.

22. A circuit comprising:
a first Muller gate configured to receive a clock signal and an enable signal and produce a first output;
a first delay circuit configured to delay the clock signal by a propagation delay associated with the first Muller gate to produce a first delayed clock signal;
a second Muller gate configured to receive the first output of the first Muller gate and the first delayed clock signal from the first delay circuit;
a second delay circuit, connected in series to the first delay circuit, the second delay circuit configured to delay the first delayed clock signal by a second propagation delay associated with the second Muller gate to produce a second delayed clock signal; and
a logic circuit configured to produce a gated clock output based on receiving the second delayed clock signal and an output of the second Muller gate.

* * * * *